BEST AVAILABLE COPY

H. A. FARNAM.

FLY-TRAP.

No. 7,576. Reissued March 27, 1877.

Witnesses:

P. C. Dietenck

Frank H. Duffy

Inventor:

Harriet A. Farnam

Per West & Bond Attorneys.

N. PETERS, PHOTO-LITHOGRAPHER, WASHINGTON, D. C.

JNITED STATES PATENT OFFICE.

HARRIET A. FARNAM, OF SOUTH BEND, INDIANA.

IMPROVEMENT IN FLY-TRAPS.

ecification forming part of Letters Patent No. 111,332, dated January 31, 1871; reissue No. 7,576, dated March 27, 1877; application filed January 8, 1877.

*all whom it may concern:*

3e it known that I, HARRIET A. FARNAM, South Bend, in the county of St. Joseph l State of Indiana, have invented certain v and useful Improvements in Fly Catch- ; and I do hereby declare that the follow- is a full, clear, and exact description there- that will enable others skilled in the art which it appertains to make and use the ıe, reference being had to the accompany- drawings, and to the letters of reference rked thereon, which form a part of this speci- ıtion.

Figure 1:
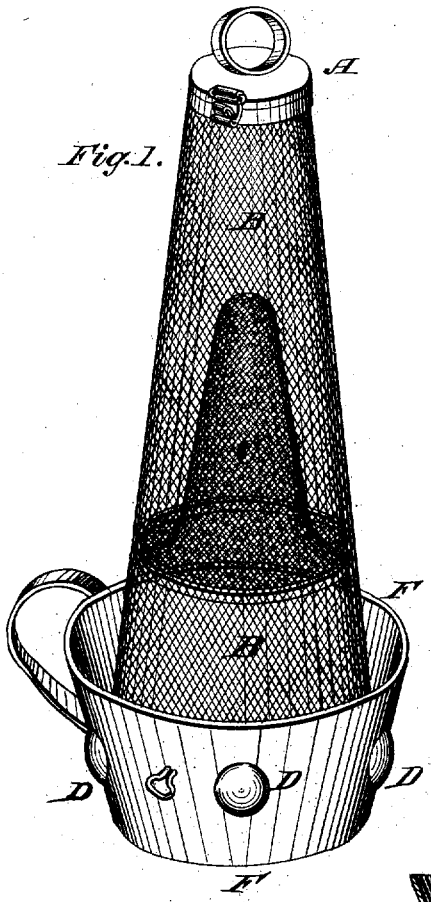
Figure 2:
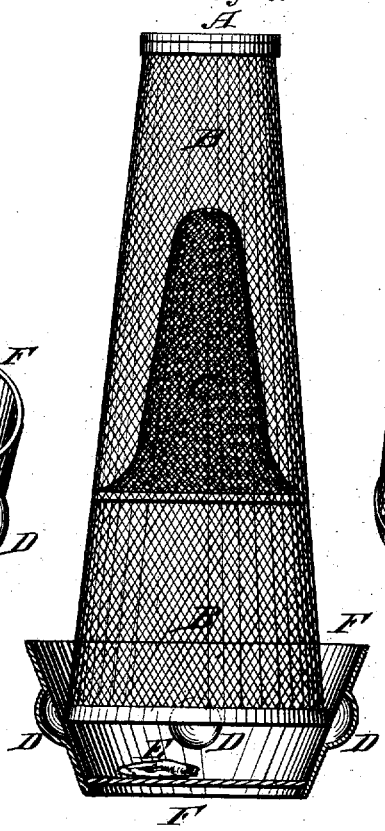
Figure 3:
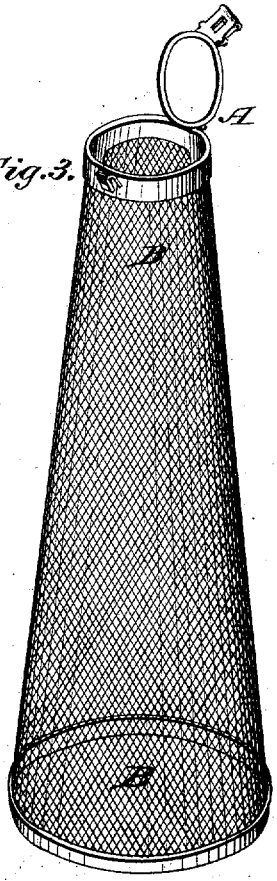
Figure 4:
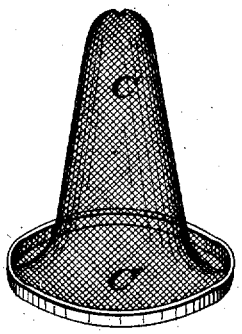
Figure 5:
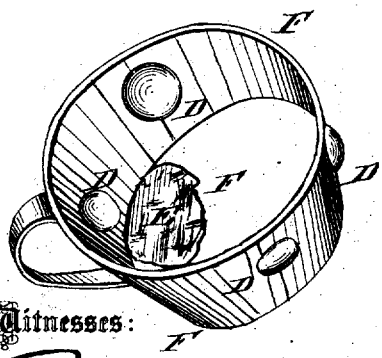

'he nature of my invention consists in so ıbining the outer cone or part with the ;-cup that the insect openings or entrance be shaded in the construction of the in- cone, so as to form an improved cage for flies, and in the combination of the bait- with the outer case and an interior cone, as hereinafter more fully described.

n the accompanying drawings, Figure 1 is elevation; Fig. 2, a vertical section; Fig. ıe outer section or cylinder, with cap; Fig. ıe inner section or cone, and Fig. 5 the bait- .

he parts, as lettered, are: A, the cover or ; B, the outer section or case; C, the in- section or cone; D, the enlargements of bait-cup, which, when the case B is in ;e, furnish the means of ingress; E, the ;, and F the bait-cup.

he parts or sections B C are made of per- ıted or woven metal, and are suitably nd with strips of tin or other suitable ma- al, as shown at Figs. 3 and 4. The part ase B is provided at its top with a cover d, A, to open for the removal of flies. The ır section or cone C is provided at its top with ıpening just large enough to permit the flies ıass through into the space between the parts or sections. The bait-cup is made in or other suitable material, and is of ı dimensions as to permit the base of the r part to pass down about half-way from top to the bottom. This cup is made flar- enough to form a considerable space for acting and gathering the flies around the ıings or entrance. It is also provided with rgements or enlarged portions, so that e supporting the cage B C there will be rvening spaces or openings for the en- ce of flies. The bait-cup and outer case are so arranged that the entrance spaces or openings are shaded or covered, so that direct rays of light do not pass through them to the bait, and thereby indicate a way of escape, and so that flies, upon leaving the bait, will pass to the perforated or woven cage, and by ascending the inner section pass through the opening into it, the visible light leading them in that direction from the bait.

It will be seen that one section of the bait-cup is used for holding the bait and the other section as a guide or way for directing the flies beneath the cage, and that the inner section or cone C of the cage is made of a continuous piece of wire-cloth without other opening at its top than the crowding or spreading apart of the mesh of the fabric, thus making a small and obscure opening, through which the flies pass into the cage, and through which they are not liable to return, and by extending the inner section out to and in contact with the outer one, and supporting one on the other, a complete cage is left after the bait-cup is removed.

In a fly-trap, I do not, broadly, claim the combination of an outer cylinder with an inner cone having an opening at the top; but

What I claim as my invention, and desire to secure by Letters Patent, is—

1. The combination of the case B and cup F, the latter constructed to cover or shade the entrance-opening, substantially as and for the purpose set forth.

2. The inner part or cone C, constructed entirely of woven fabric, having a passage-opening formed in its apex, in the manner described, and its base extending to the outer cone, to afford easy access to the passage-opening, and prevent the return of flies, and in combination with the outer case, substantially as described.

3. The combination of the bait-cup F with the case B and inner case or cone C, substantially as specified.

4. The base or cup F, in combination with the case B, supported thereon between the upper and lower sections, substantially as set forth.

HARRIET A. FARNAM.

Witnesses:
L. L. BOND,
O. W. BOND.